United States Patent
Chliwnyj et al.

(10) Patent No.: US 6,850,381 B2
(45) Date of Patent: Feb. 1, 2005

(54) APPARATUS AND METHOD FOR REDUCING DATA LOSS IN TAPE MEDIA DUE TO MEDIA EDGE DAMAGE ON THROWN WRAPS

(75) Inventors: Alex Chliwnyj, Tucson, AZ (US); Robert Allen Hutchins, Tucson, AZ (US); James Mitchell Karp, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 272 days.

(21) Appl. No.: 09/846,847

(22) Filed: May 1, 2001

(65) Prior Publication Data

US 2002/0163750 A1 Nov. 7, 2002

(51) Int. Cl.[7] .............................................. G11B 19/02
(52) U.S. Cl. ........................................ 360/71; 360/74.1
(58) Field of Search .................................. 360/71, 74.1

(56) References Cited

U.S. PATENT DOCUMENTS

| | | |
|---|---|---|
| 4,324,372 A | 4/1982 | Majicek et al. |
| 4,368,497 A | 1/1983 | Shirako |
| 4,426,047 A | 1/1984 | Richard et al. |
| 4,916,566 A | 4/1990 | Urayama |
| 5,315,461 A | 5/1994 | Todd |
| 5,431,356 A | 7/1995 | Horstman et al. |
| 5,447,279 A | 9/1995 | Janssen et al. |
| 5,613,082 A | 3/1997 | Brewer et al. |
| 5,734,540 A | 3/1998 | Jacobs et al. |
| 5,737,147 A | 4/1998 | Standiford |
| 5,860,612 A * | 1/1999 | Runyon et al. .......... 242/346.1 |
| 5,963,394 A | 10/1999 | Yamabuchi et al. |

OTHER PUBLICATIONS

"Complaint Tape Guide," S. T. Clegg and D. J. Winarski, IBM Technical Disclosure Bulletin, vol. 25, No. 2, Jul. 1982, IBM Corp. 1982.

* cited by examiner

Primary Examiner—David Hudspeth
Assistant Examiner—Mitchell Slavitt
(74) Attorney, Agent, or Firm—Robert M. Sullivan; Dillon & Yudell LLP

(57) ABSTRACT

A data storage magnetic tape uses a volume control region (VCR) that contains all of the control information for the tape. There is a large span of blank tape after the VCR region before the actual data storage region of the tape. When a tape drive spools the tape between the VCR and data storage region, the tape motion is continued past the VCR region, after the VCR region is updated, into the region of tape where there is no data of any kind. Just before reaching the data storage region, the motion of the tape is reversed and the tape is rewound into the cartridge. The portion of the tape that experiences the motion reversal is prone to be thrown such that it protrudes from the other layers of uniformly layered tape. Even if these thrown wraps are damaged, this portion of the tape has no stored data, which increases the overall reliability of the information stored on the tape.

4 Claims, 3 Drawing Sheets

APPARATUS AND METHOD FOR REDUCING DATA LOSS IN TAPE MEDIA DUE TO MEDIA EDGE DAMAGE ON THROWN WRAPS

BACKGROUND OF THE INVENTION

1. Technical Field

The present invention relates in general to an improved means for enhancing the performance of data storage media, and in particular to improving the way data is recorded and retained on data storage media. Still more particularly, the present invention relates to an improved apparatus and method for reducing data loss that occurs in tape media because of damage to the thrown wraps of the media.

2. Description of the Related Art

Data recording devices, such as data tape drives, record information to and/or read information from a data storage device, such as the data tape of a tape cartridge. The data tape is typically very thin magnetic tape and is wound or wrapped in layers on the hub of a spool. As data tapes have become increasingly thinner, they have become more susceptible to damage and data loss when exposed to mechanical shock. In particular, wraps of tape that are axially thrown off track relative to the spool (i.e., "thrown wraps" of tape) are vulnerable to physical damage and are not reliable for storing data.

Thrown wraps of media tape protrude beyond the rest of the body of tape on the spool. The body of tape takes on a donut-like shape with edges that are initially very uniform. When a tape cartridge is loaded into a tape drive and the tape is moved into and out of the cartridge for reading information therefrom and/or writing information thereto, the reversal of motion and the associated variation in the tape tension inherently causes some of the layers of tape to slightly misalign in the axial direction of the hub or spool of the tape cartridge and protrude out away from the other layers of tape. The edges of the thrown wraps are very fragile since they are essentially unsupported by the remainder of the body of the tape which is tightly wound on the spool.

If the tape cartridge experiences a mechanical shock event, such as being dropped on the ground, the flange of the spool may flex and contact the exposed edges of the thrown wraps. This contact can fold or wrinkle the edges of the thrown wraps such that the tape will not track properly during data reading and/or writing operations. The damage to the tape can be severe enough that the track following system of the tape drive cannot track the motion of the tape as it goes past the tape head. Thus, an improved apparatus and method for reducing data loss that occurs in tape media because of damage to the thrown wraps of the media would be desirable.

SUMMARY OF THE INVENTION

One embodiment of a data storage media, such as magnetic tape, uses a volume control region (VCR) that contains all of the control information for the tape. There is a large span of blank tape after the VCR region before the actual data storage region of the tape (e.g., the bulk of the tape). When a tape drive spools the tape between the VCR and data storage region, the tape motion is continued past the VCR region, after the VCR region is updated, into the region of tape where there is no data of any kind. Just before reaching the data storage region, the motion of the tape is reversed and the tape is rewound into the cartridge. The portion of the tape that experiences the motion reversal is prone to be thrown such that it protrudes from the other layers of uniformly layered tape. Even if these thrown wraps are damaged, this portion of the tape has no stored data, which increases the overall reliability of the information stored on the tape.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
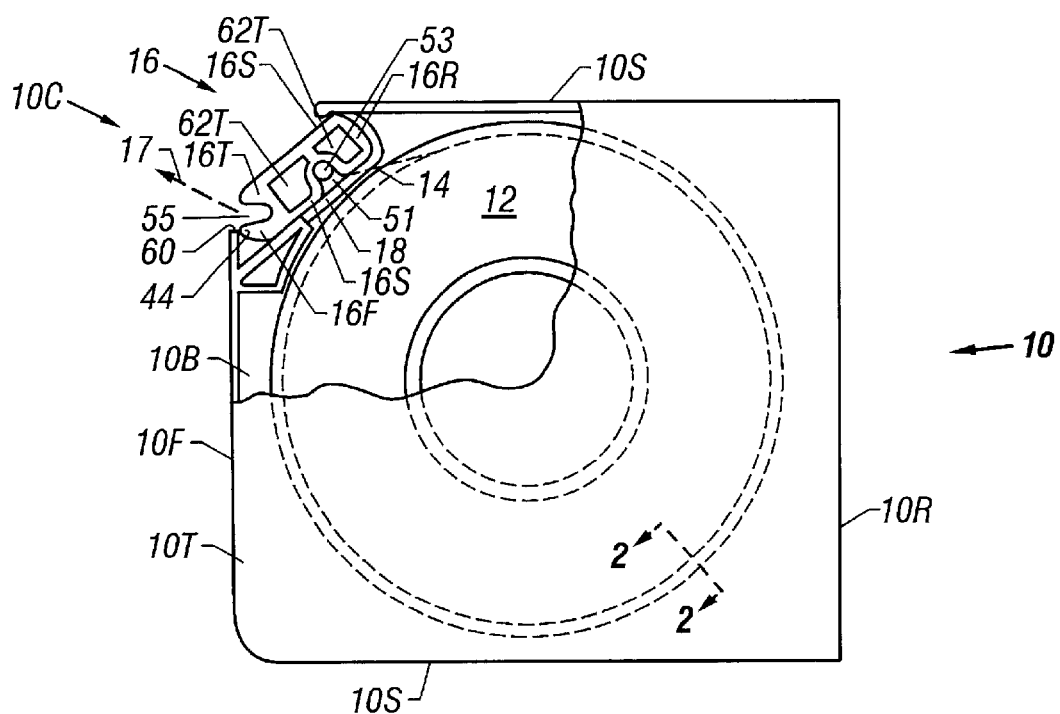
FIG. 1 is a partial sectional side view of a data tape cartridge constructed in accordance with the invention.

Referring now to FIG. 1, a preferred embodiment for a data tape cartridge 10 includes a reel hub 12 containing a plurality of layers of magnetic tape 14. A leader block 16 is attached to the free end of the tape 14 as it extends from the reel hub 12. Cartridge 10 is generally rectangular in shape except for one corner 10C which holds the leader block 16. Cartridge 10 is basically a box-like structure including the following elongated pieces: a frontal or leading edge piece 10F, a rear edge piece 10R, two side pieces 10S, an essentially flat bottom section 10B, and an essentially flat top section 10T.

The corner 10C is angled at approximately 45° relative to one adjacent side 10S and the leading edge 10F to provide a shorter fifth side in which a leader block window 18 is included. This leader block window 18 permits the existing of the tape 14 from the cartridge 10 when the leader block 16 is removed from the corner 10C for threading through a tape drive when the leader block 16 is moved in the direction of the arrow 17. The opening 18 is covered by the leader block 16 when the leader block is snapped into the well formed at the corner 10C of the cartridge 10.

The leader block 16 can be viewed generally as a rectangular block having a leading or frontal surface 16F, a rear surface 16R, side surfaces 16S, a top surface 16T, and a bottom surface 16B opposite the top surface 16T. A cutout 51 extends normal to the top and bottom surfaces of the leader block 16 and cartridge 10. Cutout 51 and a pin 53 form a fastening means for holding the tape 14 to the leader block 16. Tape 14 is attached to leader block 16 such that the side surfaces 16S of the leader block are generally parallel to the plane of the tape surface and the axis of the tape reel 12.

The front surface 16F of the leader block 16 includes engaging means for engaging an automatic threading apparatus. The engaging means includes a slot 55 offset from the front surface 16F of the leader block 16 and generally extending from the top surface 16T to the bottom surface 16B of the leader block. The front surface 16F of the leader block is generally cylindrical and is provided with a rounded boss 44 which engages with an inclined surface 60 of the corner 10C of the cartridge 10. Cavities 62T are formed in the top 16T of the leader block 16 adjacent to the cutout 51 and closer to one side 16S and the rear 16R of the leader block 16.

Figure 2:
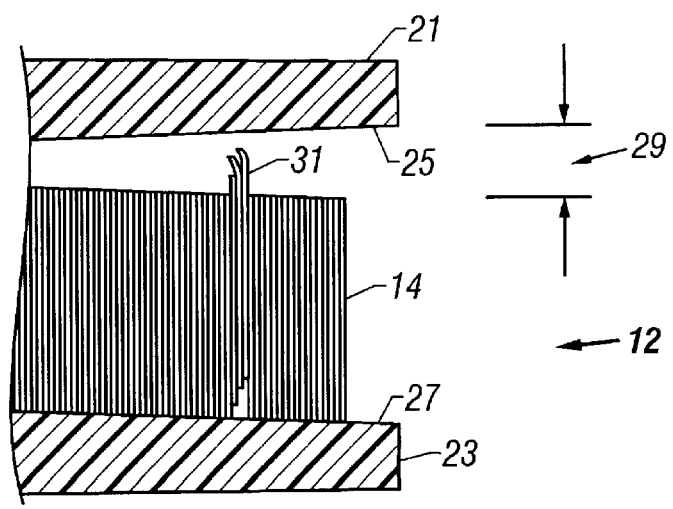
FIG. 2 is an enlarged sectional end view of the data tape cartridge of FIG. 1 taken along the line 2—2 of FIG. 1 illustrating thrown wraps of tape.

A more detailed view of the end of the flanges 21, 23 of reel 12 is shown in FIG. 2 with a section through the windings of tape 14. The distance between flanges 21, 23 is smallest at their proximal ends, next to the hub. Side 25 of flange 21 and side 27 of flange 23 are angled such that the distance between flanges 21, 23 increases in the radially outward direction (right side of FIG. 2). This feature allows air to escape from between the layers of tape 14 as it is wound around the hub at a high rate of speed. When tape 14 is wound on reel 12, tape 14 tends to stack flush along one of the flanges 21, 23, while leaving a space 29 between the stack and the other flange.

Typically tape 14 winds around the hub of reel 12 such that the edges of tape 14 in each winding or wrap are aligned with the edges of tape 14 in the other windings. Occasionally, however, one or more windings of tape 14 extend beyond the rest of the stack of tape 14 wound on reel 12. This occurrence is represented in FIG. 2 by stagger wrap fin or "thrown wrap" 31. Thrown wrap 31 may be comprised of several windings of tape 14 that are not aligned with the rest of the windings. If a physical shock occurs to cartridge that causes the distance 29 between flange 21 and tape 14 to decrease, a crease, wrinkle, or other physical damage to thrown wrap 31 may occur. Such damage can cause problems with tape 14 and the tracking thereof by the tape drive, including the loss of any data recorded on thrown wrap 31.

Figure 3:
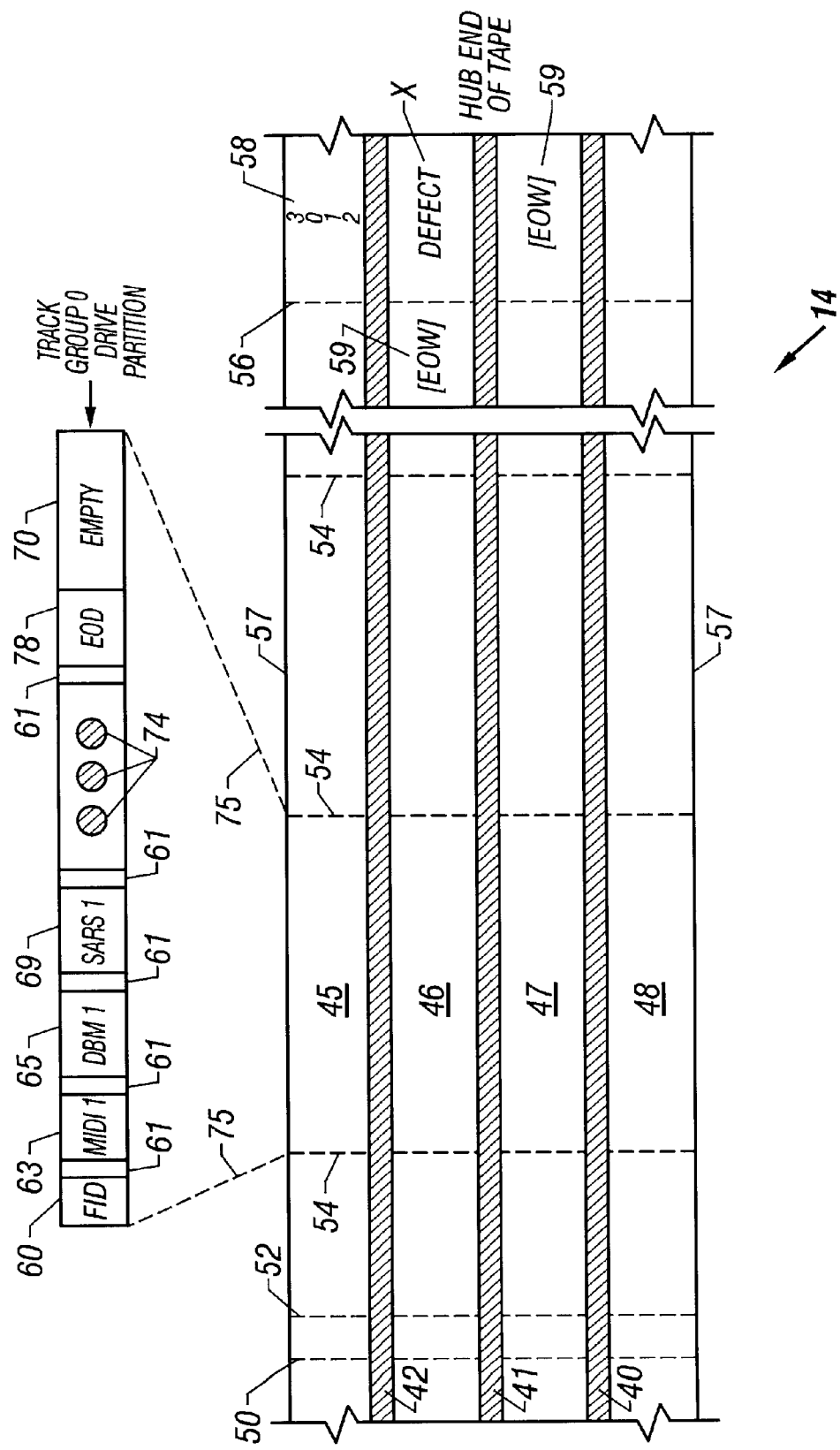
FIG. 3 is a simplified partial view of a magnetic tape utilized by the data tape cartridge of FIG. 1 and having a format employed by the present invention.

Referring now to FIG. 3 (which is not drawn to scale), the tape track format, servo format, data block map (DBM) and statistical analysis recording system (SARS) storage on tape 14 and the like are described. Tape 14 includes triple longitudinally-extending, laterally-spaced-apart, redundant identical longitudinally-extending servo areas 40–42 for laterally relatively positioning tape 14 and a recording or read/write head in the tape drive in four relative positions. At a free end of tape 14 (to the left in FIG. 3), a drive-to-tape calibration area is disposed between dashed lines 50 and 52. This area contains signals (not described) that enable the tape drive to calibrate its operation to the particular characteristics of the loaded tape 14.

The tape area between dashed line 52 and hub end of tape 14 is available for recording. The later described track groups 0–3 respectively have a beginning of wrap (BOW) tape control block (not shown) longitudinally adjacent to dashed line 52, and an end of wrap block (EOW) 59 at the hub end near line 56. Dashed lines 54 respectively indicate addressable logical partitions, each of which is a collection of contiguous sectors that are indicated and addressed using a tachometer. As will become apparent, such dashed lines can either denote such tachometer-indicated tape displacement locations for all data tracks, or only for selected data tracks.

In the latter regard, numeral 58 denotes four track groups 0–3 used in one embodiment. Serial recording proceeds from track group 0 through track group 3, no limitation thereto intended. The dashed line 54—indicated displacement locations preferably relate to tracks only in the respective track groups 0–3 . Track portions between longitudinally adjacent ones of the dashed lines 54 are partitions. Dashed line 56 indicates approaching the hub end of the tape 14. In each of the track groups, line 56 may be at a different longitudinal position. For example, if a medium defect X is longitudinally adjacent to the hub end of tape 14 affects data tracks in track groups 0 and 2 but not 1 and 3, then an end of wrap data block EOW 59 (later described) is recorded in groups 0 and 2 tracks for shortening the data track length, while an identical end of wrap block EOW 59 is written in track groups 1 and 3 at dashed line 56. Detected media defects remote from either longitudinal end of tape 14 are identified by a pair of so-called servo defect blocks (SDB), tape control blocks, that respectively are immediately upstream and downstream from the detected defect for defining a limited portion of a group of data tracks in one of the track groups 0–3 that is not available for recording because servo areas 40–42 are affected by the medium defect.

First track group 0 is laterally displaced from longitudinal edges 57 respectively by tracks in track groups 3 and 1,2. Since track group 0 is logical beginning of data recording, tape control information (DBM and SARS) is recorded in track group 0 in a so-called drive partition that exists between dashed lines 52 and a first dashed line 54. Such drive partition in track group 0 is only addressable by the tape drive and not by the controller nor other units. All other-units addressable partitions on tape 14 are arbitrarily numbered from 0 to a current maximum number of partitions. Each partition, whether a drive partition or an addressable partition, is a logical collection of contiguous sectors, each partition may have a different number of sectors. A sector (sometimes referred to as a segment) is a tachometer-determined length tape and can be accessed by moving tape 14 and monitoring the tachometer generated count values (not shown). Any form of physical location addressing may be used, such as arbitrarily selected tachometer count values. First dashed line 54 does not apply to data tracks in track groups 1–3. U.S. Pat. No. 4,393,883 shows generating physical reference values (PRV) that are usable to identify the sectors on tape 14.

Control information stored in the drive partition is useful to the controller, the other units, or the tape drive, but such control information is addressable and readable only by a peripheral drive. The tape drive may supply such information to either the controller or other units, as may be desired. The control information stored in the drive partition is that information primarily useful to the tape drive as it identifies physical locations on tape 14 of diverse control data elements useful for quickly locating data stored on tape 14. It is therefore referred to as storage medium physical access data. The usual prior art VTOC or TTOC may be stored in partition 0 for identifying to other units the informational content of tape 14 including the logical data elements as partitions, logical volumes, files, and the like. Control information shown in FIG. 3, identified by numerals 60–78, in the drive partition is not visible (addressable) outside of the tape drive. The illustrated drive partition may consist of a plurality of partitions, for example, a DBM partition for storing all copies of DBM, a SARS partition for storing all copies of SARS, and a MDI partition for storing all copies of MDI. All other partitions are addressable, explicitly or implicitly, by other units. Implicit addressing is by other units addressing files, virtual volumes and the like. The tape drive has the usual load point controls for positioning the magnetic tape and the magnetic head to first read the tracks in track group 0.

Control information in the tape drive created, updated, and managed partition includes a format identification (FID) block 60. FID 60 indicates that tape 14 is formatted as shown. All other control information is stored in K copies. K is an integer preferably 2? where J is a positive integer, such as 3. Each block of control information is separated by a usual interblock gap (IBG) 61. A first copy of the control information includes mount-demount indicator MDI block 63, copy 1 indicated by MDI 1, DBM 1 (copy 1 of K) and SARS 1 (copy1 of K). All additional copies of the control information are represented by ellipsis 74. An end-of-data (EOD) tape control block 78 indicates the end of data in the tape drive accessed partition indicated by numeral 75, also known as the volume control region (VCR). MDI 1 may be stored in VCR 75 after SARS 1 69 (i.e., between SARS 1 and EOD). Alternatively, all MDI copies may be stored in one string of blocks, all DBM copies stored in a second string of blocks, and all SARS copies stored in a third string of blocks. The sequence of storage in the drive partition is one of choice. Region 70 (not shown to scale) is a permanently empty buffer located between the end of VCR 75 and the start of the data storage region 57.

Figure 4:
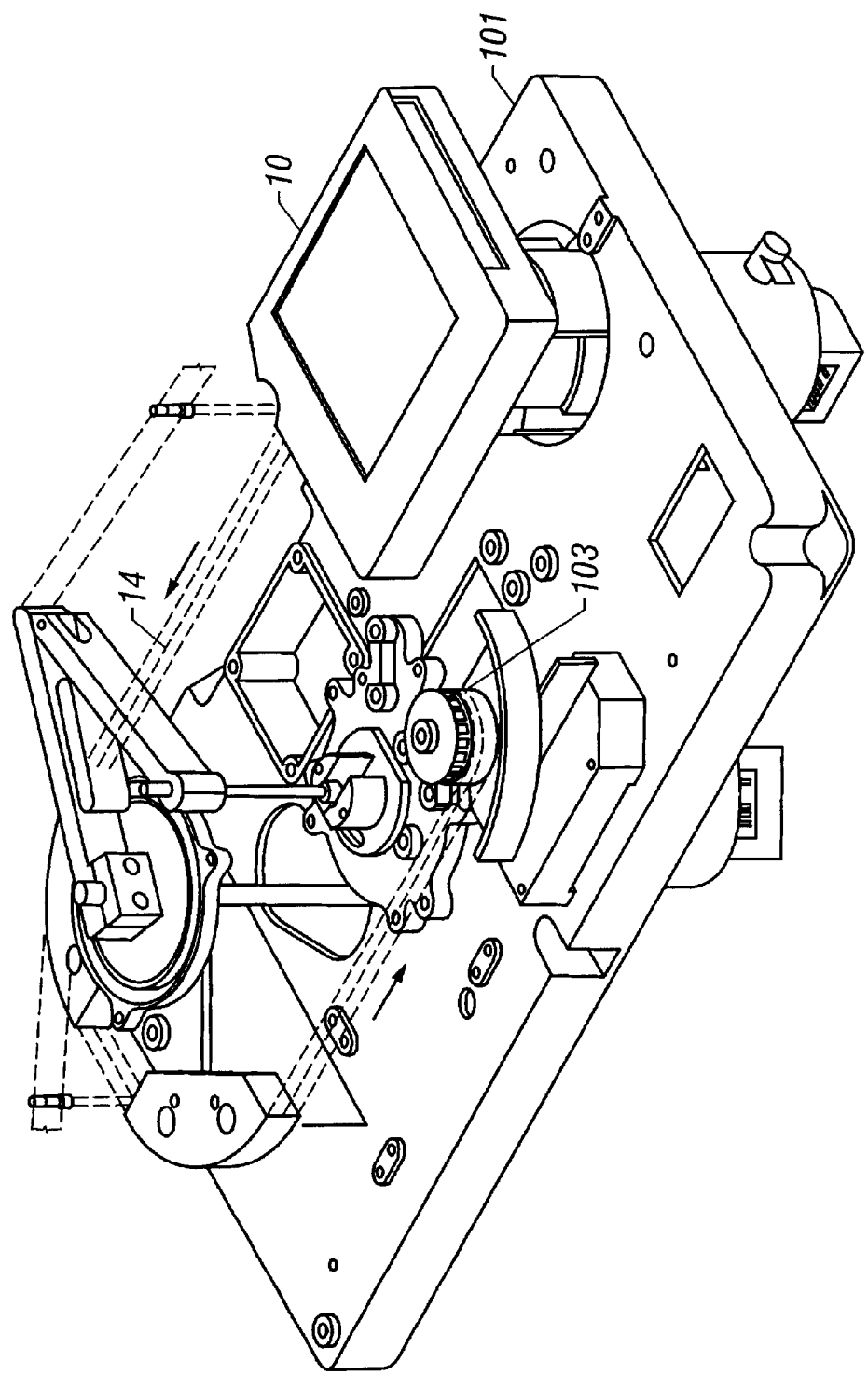
FIG. 4 is a simplified isometric view of the cartridge of FIG. 1 loaded in a tape drive during operation.

In operation (FIG. 4), cartridge 10 is loaded into a tape drive 101 and VCR 75 (FIG. 3) is read. The last record in VCR 75 is written to reflect that VCR 75 is "checked out" or may have been updated in anticipation of the information being valid because the tape may have been rewritten. VCR 75 is always checked out in this process unless the tape is write protected. This sequence anticipates that the drive is going to write on tape 14 and the data in VCR 75 about the tape is no longer valid. When the drive loads tape 14, the drive and tape subsystem do not know if the tape is going to be used for reading or writing, which is why the checked out mark is always written in VCR 75 on every load. When the drive unloads tape 14, the data in VCR 75 must reflect the new state of the tape. If tape 14 was not written to, the SARS region is updated to reflect any read errors and VCR 75 is checked in by rewriting VCR 75 with the indication that it is valid. Unless the tape is write-protected, every unload requires that the checked out bit in VCR 75 is set to checked in and the VCR is rewritten.

The present invention is employed when tape 14 is being read or written to somewhere in data region 57. Data could be written in either direction because, depending on the set of tracks being operated on, the tape is written in the forward and reverse directions. Assuming the last of the data and the end of data mark is written, the system sends a demount request so the tape is rewound to the beginning prior to region 52. Before the tape can be unloaded from the drive, some number of records in VCR 75 need to be rewritten. If the tape has only been read, then it is the last record that is rewritten. If the data region 57 was rewritten, then the other records in VCR 75 must be rewritten to reflect the new state of the tape. VCR 75 is on a set of tracks that is written or read in the forward direction, so the tape motion is started and the head moves across region 75 writing the VCR. Because of the length of the tape path (see FIG. 4), the motion is stopped in blank region 70 after enough tape is allowed to pass so that the entire VCR 75 is on the take-up spool 103 in the drive 101. Motion continues so that the tape in the tape path is in blank region 70 when the motion is stopped. Finally, tape 14 is rewound into cartridge 10 in a continuous motion.

The motion reversal occurs so that VCR 75 is all on the take-up reel in the drive at the time it is wound in a continuous motion on the spool 12 in cartridge. Thus, any thrown wraps 31 (FIG. 2) created by this process reside in the blank region 70 where there is no data stored, rather than in the data-critical VCR 75 region. Note that in the embodiment shown, if the tape was stopped and then rewound immediately after writing the VCR, the VCR portion of the tape could still be damaged due to the length of the tape path.

The present invention has several advantages. When a tape drive spools the media tape between the VCR and data storage region, the tape motion is continued past the VCR region after the VCR region is updated, into the region of tape where there is no data of any kind. This sequence forces any portion of the tape that experiences the motion reversal and, thus, is thrown to protrude from the other layers of uniformly layered tape, to be located in the blank region. Even if the thrown wraps are damaged, this portion of the tape has no stored data, which increases the overall reliability of the information stored on the tape.

While the invention has been shown or described in only some of its forms, it should be apparent to those skilled in the art that it is not so limited, but is susceptible to various changes without departing from the scope of the invention. For example, the present invention also applies to optical tape.

What is claimed is:

1. A method of protecting data stored on a data storage media tape in a tape cartridge, comprising:

(a) providing a cartridge of data storage media tape having a VCR (volume control region) region containing control information for the tape, a data storage region for reading data from the tape and writing data to the tape, and a blank region with no recorded data located between the VCR region and the data storage region of the tape;

(b) loading the cartridge into a tape drive;

(c) writing data to the data storage region of the tape;

(d) moving the tape to the VCR region to update the VCR region;

(e) continuing to move the tape past the VCR region to the blank region; and then (f) reversing the motion of the tape to rewind the tape into the cartridge before reaching the data storage region, such that any thrown wraps of the tape in the cartridge are located in the blank region.

2. The method of claim 1 wherein step (e) comprises rewinding the VCR region in the cartridge.

3. A method of protecting data stored on a data storage media tape in a tape cartridge, comprising:

(a) providing a cartridge of data storage media tape having a VCR (volume control region) region containing control information for the tape, a data storage region for reading data from the tape and writing data to the tape, and a permanently blank region with no recorded data located between the VCR region and the data storage region of the tape;

(b) loading the cartridge into a tape drive;

(c) reading data from or writing data to the data storage region of the tape;

(d) moving the tape to the VCR region to update the VCR region;

(e) continuing to move the tape past the VCR region to the blank region such that the VCR region is completely rewound in the cartridge; and then (f) reversing the motion of the tape to rewind the tape into the cartridge before reaching the data storage region, such that any thrown wraps of the tape in the cartridge are located in the blank region.

4. A program product for controlling a tape drive to protect data stored on a data storage media tape in a tape cartridge, wherein the data storage media tape has a VCR (volume control region) region containing control information for the tape, a data storage region for reading data from the tape and writing data to the tape, and a blank region with no recorded data located between the VCR region and the data storage region of the tape, the computer program product comprising:

a computer usable medium having a computer usable program means encoded therein, said computer usable program means including;

means for causing the tape drive to write data to the data storage region of the tape;

means for causing the tape drive to move the tape to the VCR region to update the VCR region;

means for causing the tape drive to continue to move the tape past the VCR region to the blank region; and then means for causing the tape drive to reverse a motion of the tape to rewind the tape into the cartridge before reaching the data storage region, such that any thrown wraps of the tape in the cartridge are located in the blank region.

* * * * *